(12) United States Patent
Murata

(10) Patent No.: US 9,633,767 B2
(45) Date of Patent: Apr. 25, 2017

(54) POWER CABLE POLYMER CONNECTOR

(71) Applicant: Hitachi Metals, Ltd., Tokyo (JP)

(72) Inventor: Wataru Murata, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 8 days.

(21) Appl. No.: 14/784,649

(22) PCT Filed: Dec. 12, 2014

(86) PCT No.: PCT/JP2014/082949
§ 371 (c)(1),
(2) Date: Oct. 15, 2015

(87) PCT Pub. No.: WO2016/092689
PCT Pub. Date: Jun. 16, 2016

(65) Prior Publication Data
US 2016/0329131 A1    Nov. 10, 2016

(51) Int. Cl.
*H02G 15/00* (2006.01)
*H01B 17/30* (2006.01)
*H02G 15/02* (2006.01)

(52) U.S. Cl.
CPC ............ *H01B 17/30* (2013.01); *H02G 15/02* (2013.01)

(58) Field of Classification Search
CPC ........ H01B 17/30; H01B 17/26; H01B 17/28; H01B 17/301; H02G 15/02; H02G 15/00; H02G 15/007; H02G 15/013; H02G 15/04; H02G 15/06; H02G 15/10; H02G 15/103; H02G 15/064
USPC ....... 174/70 R, 68.1, 68.3, 72 R, 72 A, 74 R, 174/70 C, 73.1, 71 R, 19; 248/49, 68.1
See application file for complete search history.

(56) References Cited

U.S. PATENT DOCUMENTS 3,826,860 A * 7/1974 De Sio .................. H02G 15/10
                                                         174/73.1
3,915,534 A * 10/1975 Yonkers ................ H02G 15/10
                                                         174/71 R
(Continued)

FOREIGN PATENT DOCUMENTS

| JP | 2005-176542 A | 6/2005 |
| JP | 2006-060981 A | 3/2006 |
| JP | 5060800 B2    | 10/2012 |

OTHER PUBLICATIONS

International Search Report dated Mar. 31, 2015 issued in PCT/JP2014/082949, with partial English translation.
(Continued)

*Primary Examiner* — Angel R Estrada
(74) *Attorney, Agent, or Firm* — Scully, Scott, Murphy & Presser, PC

(57) ABSTRACT

[Problem]A power cable polymer connector is provided which is lighter than when using a porcelain insulator and can exert a free-standing property to maintain the arranged position even if it is used horizontally. [Solution]A power cable polymer connector 1 includes a polymeric insulating tube 2 including a cable insertion hole 2a, 2b to allow an insertion of a stripped end 101 of a power cable 100. The polymeric insulating tube 2 further includes an insulation 20 including a polymer-based material and an embedded pipe 21 including a metal and embedded on an inner peripheral surface of the insulation 20 so as to face the end of the power cable 100.

2 Claims, 3 Drawing Sheets

(56) References Cited

U.S. PATENT DOCUMENTS

| | | | | |
|---|---|---|---|---|
| 3,949,343 A * | 4/1976 | Yonkers | ............... | H02G 15/10 |
| | | | | 174/521 |
| 6,074,229 A * | 6/2000 | Johansson | ............ | H02G 15/06 |
| | | | | 439/181 |
| 6,281,442 B1 * | 8/2001 | Guzowski | ............ | H02G 15/103 |
| | | | | 174/73.1 |
| 6,818,828 B2 * | 11/2004 | Quaggia | ............ | H02G 15/06 |
| | | | | 174/73.1 |
| 8,609,987 B2 * | 12/2013 | Li | ............ | H02G 15/02 |
| | | | | 174/19 |
| 8,889,989 B2 * | 11/2014 | Maher | ............ | H02G 15/064 |
| | | | | 174/68.1 |

OTHER PUBLICATIONS

English Abstract and translation of JP 2008-220009 A, dated Sep. 18, 2008.

\* cited by examiner

POWER CABLE POLYMER CONNECTOR

TECHNICAL FIELD

The present invention relates to a power cable polymer connector using a polymeric insulating tube.

BACKGROUND ART

Since conventional porcelain insulator-type freestanding dry terminal connectors have a relatively heavy porcelain insulator, a freestanding dry terminal connector lighter than the porcelain insulator has been proposed (see e.g., PTL 1).

The freestanding dry terminal connector is composed of a flexible rubber insulation layer having cable insertion holes for insertion of an end side of a cable, and a freestanding resin tube which is integrally provided in the insulation layer in the middle of the thickness of the insulation layer so as to extend in an axial direction and has electrical insulating properties and rigidity.

By the above composition, the weight of the terminal connector can be reduced by using the light rubber insulation layer as a core. Also, the free-standing property to maintain a vertical upright position can be exerted by using the resin tube as the core. Thus, the installation on utility poles can be facilitated.

CITATION LIST

Patent Literature

[PTL 1]
JP-B-5060800

SUMMARY OF INVENTION

Technical Problem

The conventional freestanding dry terminal connectors, however, have the freestanding resin tube as the core formed of the resin, so that if the connectors are used horizontally it is difficult for them to maintain the horizontal position by itself and the tip portion thereof may hang down. Thus, the resin tube is not good enough for the core.

It is an object of the invention to provide a power cable polymer connector that has a lighter weight than the porcelain insulator and exerts the free-standing property to maintain a horizontal position even if it is used horizontally.

Solution to Problem

To solve the problems mentioned above, the present invention provides a power cable polymer connector comprising a polymeric insulating tube comprising a cable insertion hole to allow an insertion of an end of a power cable,
  wherein the polymeric insulating tube further comprises
    an insulation comprising a polymer-based material and
    an embedded pipe comprising a metal and embedded on an inner peripheral surface of the insulation so as to face the end of the power cable.

The embedded pipe preferably comprises an outer peripheral surface not more than 6.3 μm in an arithmetic mean roughness Ra.

Advantageous Effects of Invention

According to the present invention, a power cable polymer connector can have a lighter weight than the porcelain insulator and exert the free-standing property to maintain the horizontal position even if it is used horizontally.

DESCRIPTION OF EMBODIMENTS

Figure 1:
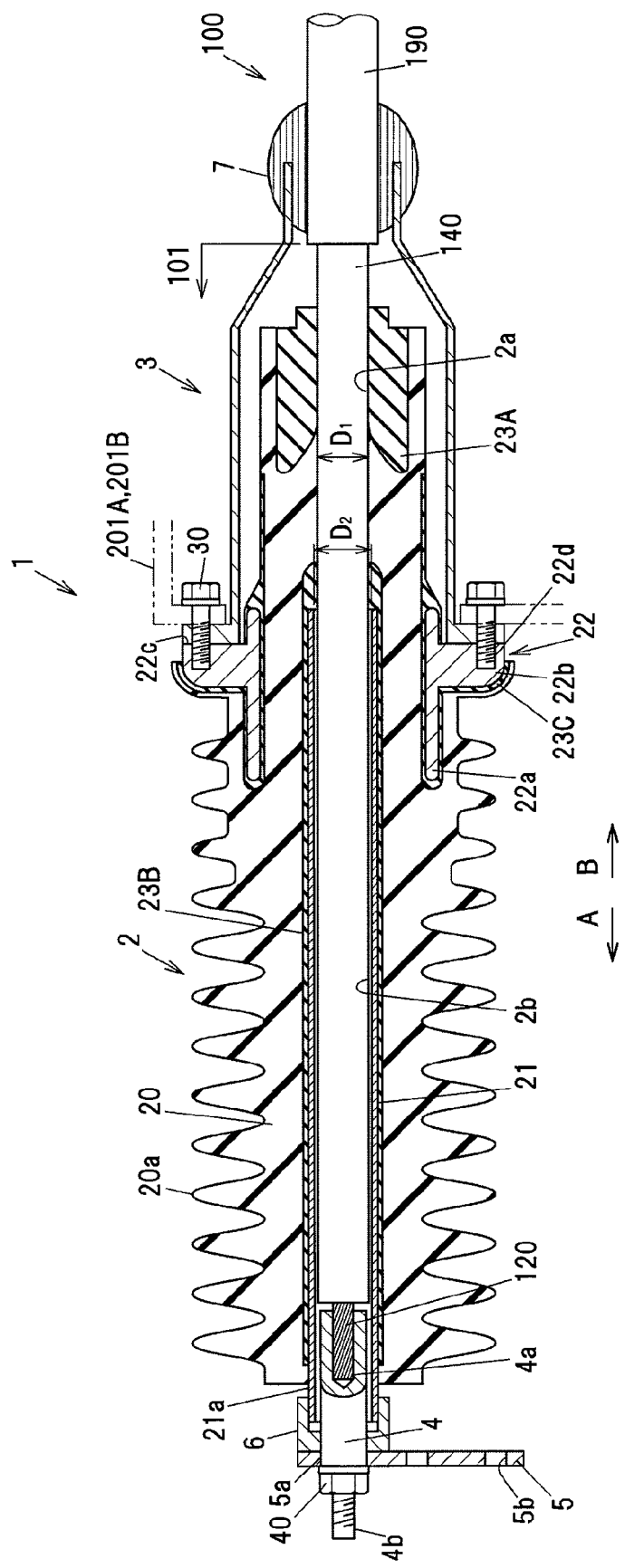
FIG. 1 is a longitudinal-sectional view showing a configuration example of a power cable polymer connector in a first embodiment of the present invention.

Embodiments of the invention will be described below in reference to the drawings. Constituent elements having substantially the same functions are denoted by the same reference numerals in each drawing and the overlapping explanation thereof will be omitted.

First Embodiment

Figure 2:
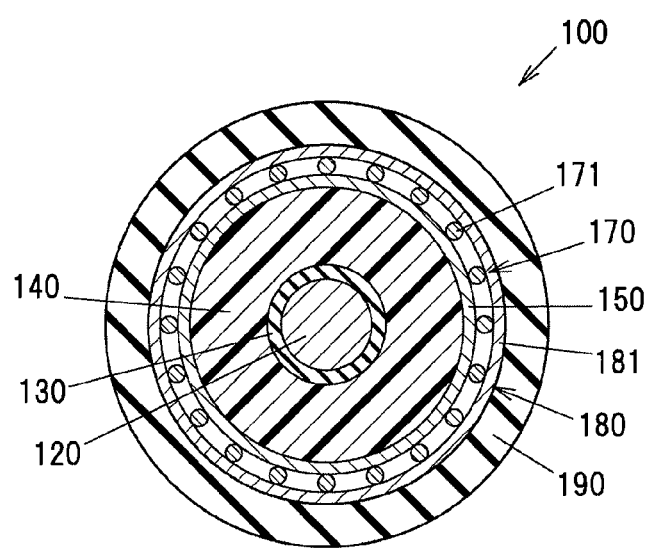
FIG. 2 is a cross-sectional view showing a power cable shown in FIG. 1.

FIG. 1 is a longitudinal-sectional view showing a configuration example of a power cable polymer connector in the first embodiment of the invention. FIG. 2 is a cross-sectional view showing a power cable shown in FIG. 1.

A power cable polymer connector 1 is formed mainly of a polymer-based material (an insulating polymer material), and is provided with a polymeric insulating tube 2 having cable insertion holes 2a and 2b for insertion of a stripped end 101 of a power cable 100, a protective metal fitting 3 for protecting a rear-end side B (opposite to an insertion direction A) of the polymeric insulating tube 2, a conductor-connecting rod 4 connected to a conductor 120 of the power cable 100, a fixing terminal 5 to which the conductor-connecting rod 4 is attached, a high-pressure shield 6 connected to the conductor-connecting rod 4 via the fixing terminal 5, and a waterproofing portion 7 for sealing between the protective metal fitting 3 and the power cable 100.

Configuration of Polymeric Insulating Tube

The polymeric insulating tube 2 is provided with a flexible insulation 20 formed of a polymer-based material, an embedded pipe 21 as a reinforcing member or a core formed of a metal and embedded on an inner peripheral surface of the insulation 20 so as to face an insulation layer 140 of the end 101 of the power cable 100, an embedded flange 22 as a reinforcing member or a core formed of a metal and embedded in the insulation 20 on the outer peripheral side, a first semi-conductive portion 23A for relaxing an electric field at the end 101 of the power cable 100, a second semi-conductive portion 23B for relaxing an electric field in the embedded pipe 21, and a third semi-conductive portion 23C for relaxing an electric field in the embedded flange 22. The insulation 20, the embedded pipe 21, the embedded flange 22 and the first to third semi-conductive portions 23A to 23C, which constitute the polymeric insulating tube 2, are integrally formed using a mold in a factory. The insulation 20 and the first to third semi-conductive portions 23A to 23C here are an example of insulation protective layer.

Plural umbrella portions 20a are formed on the outer periphery of the insulation 20 at certain intervals. The polymer-based material for forming the insulation 20 is, e.g., a silicone rubber, an ethylene-propylene rubber (EPM) or an ethylene-propylene-diene rubber (EPDM), etc.

The first cable insertion hole 2a of the insulation protective layer located on the side B opposite to the insertion direction A has a smaller inner diameter than an outer diameter $D_1$ of the end 101 of the power cable 100, i.e., of the insulation layer 140, before insertion of the end 101 of the power cable 100, and is tightly in contact with the insulation layer 140 once the insulation layer 140 of the power cable 100 is inserted.

The embedded pipe 21 is formed of, e.g., a metal such as brass or aluminum alloy. The embedded pipe 21 has, e.g., an outer diameter of 30 to 50 mm and a thickness of 2 to 5 mm. To facilitate insertion of the power cable 100, the embedded pipe 21 has the second cable insertion hole 2b having an inner diameter $D_2$ which is larger than the outer diameter of the insulation layer 140. Since the outer peripheral surface of the embedded pipe 21 is covered with the second semi-conductive portion 23B, it is possible to use a commercially available product as the embedded pipe 21. Alternatively, the second semi-conductive portion 23B can be omitted when the embedded pipe 21 is formed to have a smooth outer peripheral surface (e.g., with an arithmetic mean roughness Ra of not more than 6.3 μm).

The embedded pipe 21 also has a portion 21a which is located at an end portion in the insertion direction A and is exposed from the insulation 20 in an axial direction of the cable. The exposed portion 21a is connected to the high-pressure shield 6 as a connecting member, and the high-pressure shield 6 is connected to the conductor 120 of the power cable 100 via the fixing terminal 5 and the conductor-connecting rod 4. As a result, the embedded pipe 21 exerts a shielding effect. That is, in case of a structure in which the embedded pipe 21 is not embedded on the inner peripheral surface of the insulation 20, a space between the inner peripheral surface and the insulation layer 140 of the power cable 100 needs to be filled with an insulating compound to prevent insulation breakdown. On the other hand, in the present embodiment, since the embedded pipe 21 is embedded on the inner peripheral surface of the insulation 20 and is connected to the conductor 120 of the power cable 100, a space between the embedded pipe 21 and the insulation layer 140 is a close space and there is no need to fill a compound between the embedded pipe 21 and the insulation layer 140.

The embedded flange 22 is provided with a cylinder portion 22a having a cylindrical shape and a flange portion 22b provided on the outer peripheral surface of the cylinder portion 22a all around the circumference. The embedded flange 22 is embedded in the insulation 20 on the outer peripheral side so that a mounting surface 22c to be attached to another member is exposed from the insulation 20. Female screws 22d are formed on the mounting surface 22c so that the embedded flange 22 can be attached to a case, etc., by bolts 30. The embedded flange 22 having such a configuration is formed of, e.g., a metal such as brass or aluminum alloy and is connected to a ground when in use.

The first to third semi-conductive portions 23A to 23C are formed mainly of a polymer-based material. In detail, the first to third semi-conductive portions 23A to 23C are formed by extruding a polymer-based material which is obtained by, e.g., dispersing conductive powder such as carbon in a silicone rubber, EMP or EPDM, etc., and thus has conductivity.

The first semi-conductive portion 23A, before insertion of the end 101 of the power cable 100, has a smaller outer diameter than the outer diameter $D_1$ of the insulation layer 140. The second semi-conductive portion 23B covers the outer peripheral surface of the embedded pipe 21 except an end portion on the insertion direction A side. The third semi-conductive portion 23C covers a surface of the embedded flange 22 which is not exposed from the insulation 20.

Other Configuration

The protective metal fitting 3 is formed of, e.g., a metal such as brass or aluminum alloy and is configured to allow the power cable polymer connector 1 to be attached to a case 201A or 201B (described later) by the bolts 30.

The conductor-connecting rod 4 has a connection hole 4a formed on the rear-end side and a male screw 4b formed on the front-end side. After inserting the conductor 120 of the power cable 100 into the connection hole 4a of the conductor-connecting rod 4, the diameter of the connection hole 4a is reduced by crimping the rear-end side of the conductor-connecting rod 4 and the conductor-connecting rod 4 is thereby connected to the conductor 120 of the power cable 100.

The fixing terminal 5 has an insertion hole 5a for inserting the conductor-connecting rod 4 and a connection hole 5b to which an electric wire is connected. The conductor-connecting rod 4 is inserted into the insertion hole 5a, the male screw 4b is tightened with a nut 40, and the fixing terminal 5 is thereby attached to the conductor-connecting rod 4.

The high-pressure shield 6 is formed of a metal and has a cylindrical shape surrounding the conductor-connecting rod 4. The high-pressure shield 6 connects the embedded pipe 21 to the fixing terminal 5 and the conductor-connecting rod 4 is thereby shielded.

The waterproofing portion 7 is formed by winding a highly waterproof member, e.g., a polyethylene tape or epoxy tape, etc., having an adhesive layer.

Configuration of Power Cable

The power cable 100 is composed of the conductor 120 formed of a twisted wire, an inner semi-conductive layer 130 formed around the conductor 120, the insulation layer 140 formed around the inner semi-conductive layer 130, an outer semi-conductive layer 150 formed around the insulation layer 140, a shield layer 170 formed by winding wires 171 around the outer semi-conductive layer 150, a binding tape layer 180 formed by winding a binding tape 181 around the shield layer 170, and a sheath layer 190 formed around the binding tape layer 180.

The conductor 120 is formed by twisting plural strands together. As the strand, it is possible to use a wire rod, e.g., a tin-plated soft copper wire, etc. The conductor 120 transmits electricity with a high voltage of, e.g., not less than 7000V.

The inner semi-conductive layer 130 and the outer semi-conductive layer 150 are provided to relax electric field concentration, is formed mainly of a polymer-based material, and is formed by extruding a material which is obtained by, e.g., dispersing conductive powder such as carbon in a rubber such as ethylene-propylene rubber, ethylene-vinyl acetate copolymer (EVA) resin or butyl rubber and thus has conductivity.

The insulation layer 140 is formed by extruding a material such as ethylene-propylene rubber, vinyl chloride, cross-linked polyethylene, silicone rubber or fluorine-based material, etc.

The shield layer 170 is formed by spirally winding the wires 171 around the outer semi-conductive layer 150 along the axial direction of the cable. The shield layer 170 is connected to a ground when in use.

The binding tape layer 180 is formed by spirally winding the binding tape 181, with an overlap, around the shield layer 170 along the axial direction of the cable. The binding tape 181 used can be, e.g., a plastic or rayon tape having a thickness of 0.03 to 0.5 mm and a width of 50 to 90 mm.

The sheath layer 190 is formed by extruding a material formed by adding a cross-linking agent, etc., to a rubber such as natural rubber, butyl rubber, halogenated butyl rubber, ethylene-propylene rubber, chloroprene rubber, styrene-butadiene rubber, nitrile rubber, chlorosulfonated polyethylene, chlorinated polyethylene, epichlorohydrin rubber, acrylic rubber, silicone rubber, fluoro-rubber, urethane rubber or halogen-free polyolefin elastomer.

Functions and Effects of the First Embodiment

In the first embodiment, the following functions and effects are obtained.

(1) Since a polymer-based material, which is lighter than porcelain, is used as the insulation and also the thin embedded pipe 21 is used as a reinforcing member, the power cable polymer connector 1 of the invention is lighter than when using a porcelain insulator.

(2) The embedded pipe 21 formed of a metal is embedded on the inner peripheral surface of the insulation 20. Therefore, even when used horizontally, the power cable polymer connector 1 of the invention exerts the free-standing property and can maintain the horizontal position.

(3) In addition to the embedded pipe 21, the embedded flange 22 formed of a metal is also embedded in the insulation 20 on the outer peripheral side. Therefore, even when used horizontally, the power cable polymer connector 1 of the invention exerts the free-standing property and can maintain the horizontal position.

(4) The outer peripheral surface of the embedded pipe 21 is covered with the second semi-conductive portion 23B. Therefore, even if the embedded pipe 21 has a flaw on the outer peripheral surface, electric field concentration due to the flaw can be relaxed.

(5) The surface of the embedded flange 22, except a portion exposed from the insulation 20, is covered with the third semi-conductive portion 23C. Therefore, even if the embedded flange 22 has a flaw on the surface, electric field concentration due to the flaw can be relaxed.

(6) Since the embedded pipe 21 is connected to the conductor 120 of the power cable 100, a space between the embedded pipe 21 and the insulation layer 140 is a close space and there is no need to fill a compound between the embedded pipe 21 and the insulation layer 140.

Second Embodiment

Figure 3:
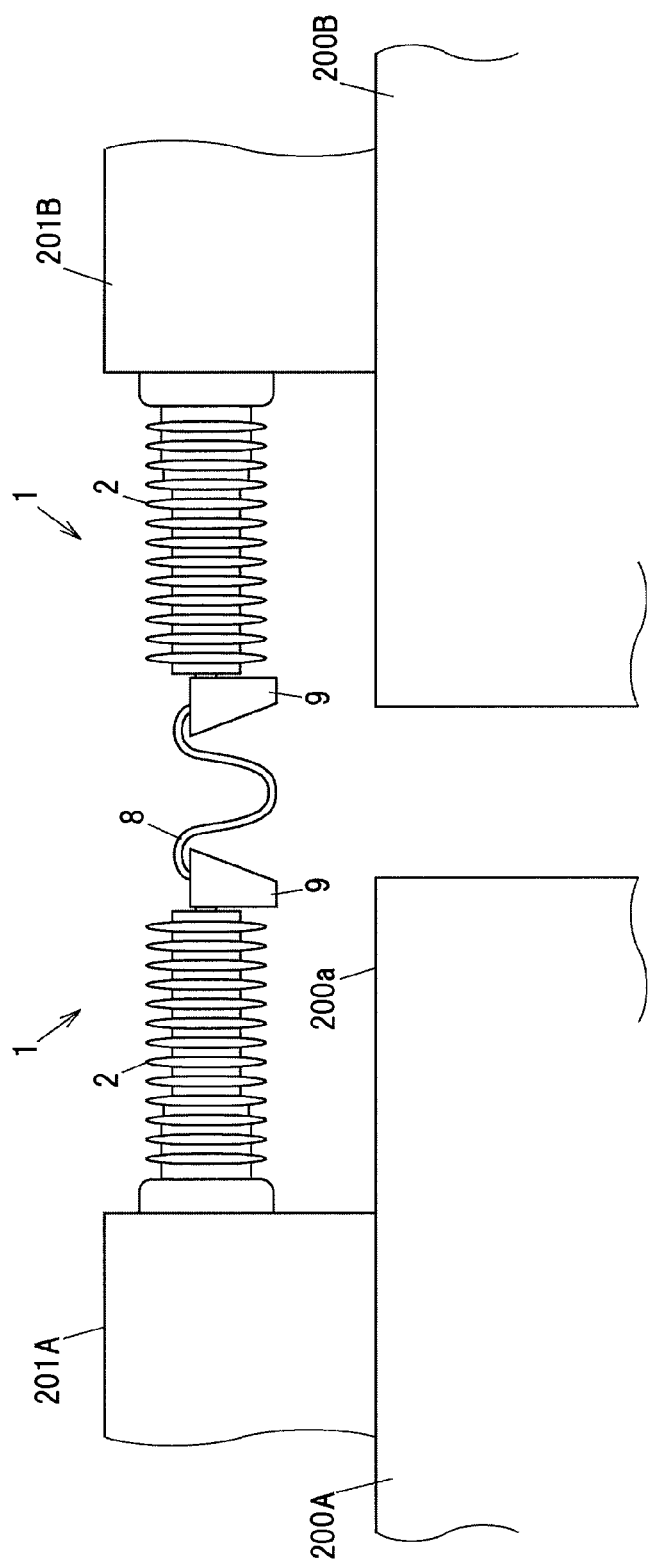
FIG. 3 is a front view showing a main portion of a configuration example of vehicle-to-vehicle connector in a second embodiment of the invention.

FIG. 3 is a front view showing a main portion of an example of vehicle-to-vehicle connector in the second embodiment of the invention. The vehicle-to-vehicle connector, to which the power cable polymer connector in the first embodiment is applied, includes a power cable polymer connector 1A attached to the case 201A provided on a roof of a railway vehicle 200A on one side, a power cable polymer connector 1B attached to the case 201B provided on a roof of a railway vehicle 200B on the other side, a flexible electric wire 8 for connecting the two power cable polymer connectors 1A and 1B, and insulation covers 9 covering the conductor-connecting portions 4, the fixing terminals 5 and the high-pressure shields 6 of the power cable polymer connectors 1A and 1B.

To attach the power cable polymer connectors 1A and 1B to the cases 201A and 201B, the bolts 30 are screwed into the female screws 22d of the embedded flange 22 and tightened with the protective metal fitting 3 in-between, as shown in FIG. 1.

The power cable polymer connectors 1A and 1B are connected to each other by attaching a conductor of the electric wire 8 to the respective fixing terminals 5.

Functions and Effects of the Second Embodiment

In the second embodiment, the following functions and effects are obtained.

(1) In the power cable polymer connectors 1A and 1B, the embedded pipe 21 formed of a metal is embedded on the inner peripheral surface of the insulation 20 and also the embedded flange 22 formed of a metal is embedded in the insulation 20 on the outer peripheral side. Therefore, the power cable polymer connectors 1A and 1B hardly hang down on the tip side even when positioned horizontally and this allows the power cable polymer connectors 1A and 1B to be used in a horizontal position.

(2) The power cable polymer connectors 1A and 1B are connected to each other by the flexible electric wire 8. Therefore, even when the railway vehicles 200A and 200B turn a curve, it is possible to follow the curve.

The present invention is not intended to be limited to the above-mentioned embodiments, and the various kinds of embodiments can be implemented. For example, although the cable terminal connector has been described in each embodiment, the invention is also applicable to a cable intermediate connector.

In addition, although horizontal use has been described in the second embodiment, the invention is also applicable to vertical use.

In addition, some of the constituent elements in the above-mentioned embodiments can be omitted or changed without changing the gist of the invention. For example, in the above-mentioned embodiments, the second semi-conductive portion 23B may be omitted when forming the embedded pipe 21 to have a smooth or mirror outer peripheral surface. Also, in the above-mentioned embodiments, the third semi-conductive portion 23C may be omitted when forming the embedded flange 22 to have a smooth or mirror surface.

REFERENCE SIGNS LIST 1, 1A, 1B: POWER CABLE POLYMER CONNECTOR
2: POLYMERIC INSULATING TUBE
2a: FIRST CABLE INSERTION HOLE
2b: SECOND CABLE INSERTION HOLE
3: PROTECTIVE METAL FITTING
4: CONDUCTOR-CONNECTING ROD
4a: CONNECTION HOLE
4b: MALE SCREW
5: FIXING TERMINAL
5a: INSERTION HOLE
5b: CONNECTION HOLE
6: HIGH-PRESSURE SHIELD
7: WATERPROOFING PORTION
8: ELECTRIC WIRE
9: COVER
20: INSULATION

20a: UMBRELLA PORTION
21: EMBEDDED PIPE
22: EMBEDDED FLANGE
22a: CYLINDER PORTION
22b: FLANGE PORTION
22c: MOUNTING SURFACE
22d: FEMALE SCREW
23A: FIRST SEMI-CONDUCTIVE PORTION
23B: SECOND SEMI-CONDUCTIVE PORTION
23C: THIRD SEMI-CONDUCTIVE PORTION
30: BOLT
40: NUT
100: POWER CABLE
120: CONDUCTOR
130: INNER SEMI-CONDUCTIVE LAYER
140: INSULATION LAYER
150: OUTER SEMI-CONDUCTIVE LAYER
170: SHIELD LAYER
171: WIRE
180: TAPE LAYER
181: TAPE
190: SHEATH LAYER
200A, 200B: RAILWAY VEHICLE
201A, 201B: CASE
A: INSERTION DIRECTION
B: REAR-END SIDE (OPPOSITE SIDE)

The invention claimed is:

1. A power cable polymer connector, comprising a polymeric insulating tube comprising a cable insertion hole to allow an insertion of a stripped end of a power cable,
wherein the polymeric insulating tube further comprises an insulation comprising a polymer-based material and an embedded pipe comprising a metal and embedded on an inner peripheral surface of the insulation so as to face the end of the power cable.

2. The power cable polymer connector according to claim 1, wherein the embedded pipe comprises an outer peripheral surface not more than 6.3 μm in an arithmetic mean roughness Ra.

* * * * *